United States Patent Office 3,293,239
Patented Dec. 20, 1966

3,293,239
CARBAZOLE DISAZO DYESTUFFS
Eiji Koike, Kenro Ohbayashi, and Fujio Kanazawa, Toyonaka-shi, and Hideo Otsuka, Fuse-shi, Japan, assignors to Sumitomo Chemical Company, Ltd., and to Toyo Spinning Co., both of Osaka, Japan, both corporations of Japan
No Drawing. Filed Aug. 16, 1963, Ser. No. 302,736
Claims priority, application Japan, Oct. 25, 1962, 37/47,637
4 Claims. (Cl. 260—164)

The present invention relates to new disazo disperse dystuffs, having the general formula,

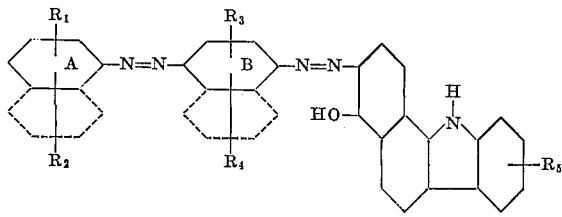

wherein $R_1$ and $R_2$ each represents a member selected from the group consisting of hydrogen atom, alkyl radical, alkoxy radical, halogen atom and nitro radical, $R_3$ and $R_4$ each represents a member selected from the group consisting of hydrogen atom, alkyl radical, alkoxy radical and halogen atom, $R_5$ represents a member selected from the group consisting of hydrogen atom, halogen atom and alkyl radical; and A and B each represents a nucleus selected from benzene and napthalene nuclei; and to a method for producing the same.

An object of the present invention is to provide new diazo disperse dyesuffs which have excellent dyeability to fibers, films and the like shaped articles, particularly to synthetic fibers, containing polyolefine such as polyethylene and polypropylene. Another object is to provide a method for producing the disazo disperse dyestuffs as mentioned above. Still another object is to provide a method of dyeing synthetic fibers, films and the like shaped articles, containing polyolefine such as polyethylene and polypropylene with high fastnesses to light, solvents and washing. Further object is to provide synthetic fibers, films and the like shaped articles containing polyolefine such as polyethylene and polypropylene which are dyed with a dyestuff as mentioned above. Other objects would be apparent from the following description.

The disazo disperse dyestuff according to the invention may be produced by coupling a diazotized monoazo-amino compound having the general formula,

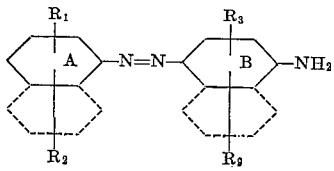

wherein $R_1$ and $R_2$ each represents a member selected from a non-dissociative substituent group consisting of hydrogen atom, alkyl radical, alkoxy radical, halogen atom and nitro radical, $R_3$ and $R_4$ each represents a member selected from the group consisting of hydrogen atom, alkyl radical, alkoxy radical and halogen atom; and A and B each represents a nucleus selected from benzene and naphthalene nuclei; with an azo component, a 4-hydroxy-1',2'-benzocarbazole derivative having the general formula,

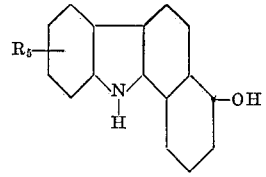

wherein $R_5$ represents a member selected from the group consisting of hydrogen atom, halogen atom and alkyl radical having up to 12 carbon atoms.

The monoazo-amino compounds set forth hereinbefore include 4-amino-1,1'-azobenzene, 4-aminonaphthalene-1,1'-azobenzene, 4-aminobenzene - 1,1' - azonaphthalene and their derivatives having one or more non-dissociative substituents. These monoazo-amino compounds may be produced by coupling a diazotized amino compound (first component) having the general formula,

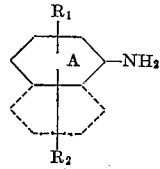

wherein $R_1$ and $R_2$ each represents a member selected from a non-dissociative substituent group consisting of hydrogen atom, alkyl radical, alkoxy radical, halogen atom and nitro radical; and A represents a nucleus selected from benzene and naphthalene nuclei; with an amino compound (second component) having the general formula,

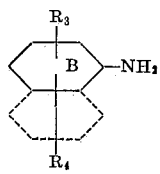

wherein $R_3$ and $R_4$ each represents a member selected from the group consisting of hydrogen atom, alkyl radical, alkoxy radical and halogen atom; and B represents a nucleus selected from benzene and naphthalene nuceli.

Examples of the first component involve aniline,
4-methylaniline,
3-methylaniline,
2-methylaniline,
2,5-dimethylaniline,
3,5-dimethylaniline,
2,4-dimethylaniline,
2,3-dimethylaniline,
2-ethylaniline,
4-ethylaniline,
4-butylaniline,
4-methoxyaniline,
3-methoxyaniline,
2-methoxyaniline,
4-ethoxyaniline,
3-ethoxyaniline,
2-ethoxyaniline,
2,5-dimethoxyaniline, 2,4-dimethoxyaniline,
2,5-diethoxyaniline,
2,4-diethoxyaniline,
2-methoxy-5-methylaniline,
1-naphthylamine,
2-napthylamine,
4-chloroaniline,
3-chloroaniline,
2-chloroaniline,
4-nitroaniline,
3-nitroaniline,
3-chloro-4-methylaniline, and the like.

Examples of the second component involve aniline, 2-methylaniline, 2-ethylaniline, 2-chloroaniline (these being employed in the form of the ω-methanesulfonic acid derivative in most cases), 3-methylaniline, 2,5-dimethylaniline, 2,3-dimethylaniline, 3-methoxyaniline, 2,5-dimethoxyaniline, 2,5-diethoxyaniline, 2-methoxy-5-methylaniline, 1-napthylamine, 2-methoxy-1-naphthylamine, 2-ethoxy-1-naphthylamine, and the like.

The monoazo-amino compounds produced by coupling a diazotized first component with a second component, are further diazotized and coupled with an azo component, a 4-hydroxy - 1',2' - benzocarbazole derivative (third component). The procedure for the diazotization and coupling may be obvious to those skilled in the art.

The third components, the 4-hydroxy-1',2'-benzocarbazole derivatives, can be produced by reacting aniline, a haloaniline or an alkylaniline in which the alkyl radical has up to 12 carbon atoms with 1,5-dihydroxynaphthalene according to the well known method. Examples of the haloaniline and alkylaniline involve, among others, 2-chloroaniline, 3-chloroaniline, 4-chloroaniline, 2-methylaniline, 3-methylaniline, 4-methylaniline, 2-ethylaniline, 4-ethylaniline, 2-butylaniline, 4-butylaniline, 4-dodecylaniline and the like.

By the above-mentioned coupling procedure with the third component, the new disazo dyestuffs of the present invention are obtained.

The disazo dyestuffs according to the present invention can be used for dyeing hydrophobic fibers (in the form of thread, yarn and woven and knitted fabrics and textiles), films and other shaped articles, containing polyolefines, for example, polyethylene and polypropylene in special color tones, under a dispersing condition in an aqueous medium according to the conventional procedures, with high exhaustion and high fastnesses to light and organic solvents in practical use. And the present disazo dyestuff can also be used for dyeing other hydrophobic fibers such as aromatic polyester fiber and acetylcellulose fiber, with high fastenesses to light and sublimation. If desired, the present disazo dyestuff may be formed by effecting the diazotization and coupling on a fiber, fabric or textile, as in the conventional procedure.

The disazo dyestuffs according to the present invention may be used in particles finely divided by a suitable means, more preferably, as a mixture of such particles with an agent such as alkylnaphthalenesulfonic acid-formaldehyde condensate. Dyeing of polyolefine articles is effected, as in the ordinary disperse dyestuffs, in the form of an aqueous dispersion or suspension at a bath temperature of 80° to 120° C., in the presence of an anionic or nonionic surface active agent as the case may be.

The following examples are given in order to illustrate the invention and not to limit the invention, and, in the examples, parts and percent are described in the meanings by weight unless otherwise identified.

*Example 1*

To 250 parts of water, 19.7 parts of 4-amino-1,1'-azobenzene and 30 parts of 35% hydrochloric acid are added, and the mixture is stirred. Then 7 parts of sodium nitrite dissolved in 20 parts of water is added under stirring thereto. The diazotization reaction is carried out under stirring for 2 hours at 15°–20° C. On the other hand, a solution of 24.7 parts of 4-hydroxy-10-methyl-1',2'-benzocarbazole, 4 parts of sodium hydroxide and 10 parts of soda ash, dissolved in 200 parts of water, is cooled by adding 100 parts of ice. The solution of diazotized monoazo-amino compound prepared as above is added dropwise thereto, while maintaining the temperature of the reaction mixture at not higher than 5° C. After the dropping is finished, the stirring is continued for 2 hours, and the crystals isolated are separated by filtration, washed with water and dried, to give 41 parts of brownish black powder. The dyestuff thus obtained is represented by the following formula,

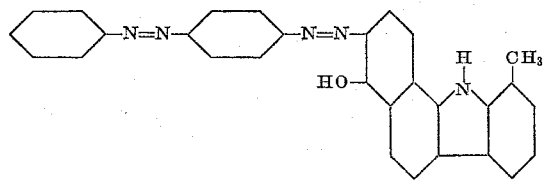

and dyes hydrophobic fibers such as polyolefine, polyester and acetylcellulose in brown color.

*Example 2*

To 350 parts of water, 25.7 parts of 4-aminonaphthalene-1,1'-azobenzene and 26 parts of 35% hydrochloric acid are added, and the mixture is stirred. After the mixture is cooled by adding 100 parts of ice, 7 parts of sodium nitrite dissolved in 20 parts of water is added under stirring thereto. The diazotization reaction is carried out under stirring for 2 hours at 6~8° C.

On the other hand, a solution of 26.1 parts of 4-hydroxy-10-ethyl-1',2'-benzocarbazole, 4 parts of sodium hydroxide and 8 parts of soda ash, dissolved in 200 parts of water, is cooled by adding 100 parts of ice. The solution of diazotized monoazo-amino compound prepared as above is added dropwise thereto, while maintaining the temperature of the reaction mixture at not higher than 5° C. After the dropping is finished, the stirring is continued for 2 hours, and the crystals isolated are separated by filtration, washed with water and dried, to give 46 parts of dark black powder. The dyestuff thus obtained is represented by the following formula,

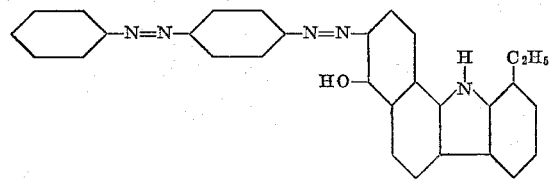

and dyes hydrophobic fibers in reddish purple color.

*Example 3*

Twenty-nine point two parts of 4-amino-2,5-dimethoxy-4'-chloro-1,1'-azobenzene is diazotized in the same method as described in the Example 1 instead of 19.7 parts of 4-amino-1,1'-azobenzene, and coupled with 24.7 parts of 4-hydroxy-8-methyl-1',2'-benzocarbazole as described in the Example 1, to give 49.5 parts of brownish black powder. The dyestuff thus obtained is represented by the following formula,

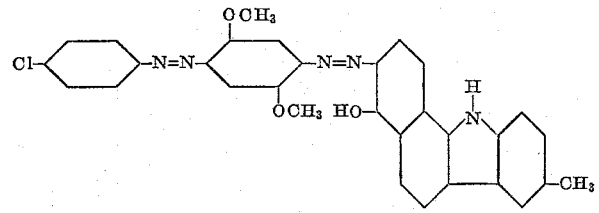

and dyes hydrophobic fibers in bluish purple color.

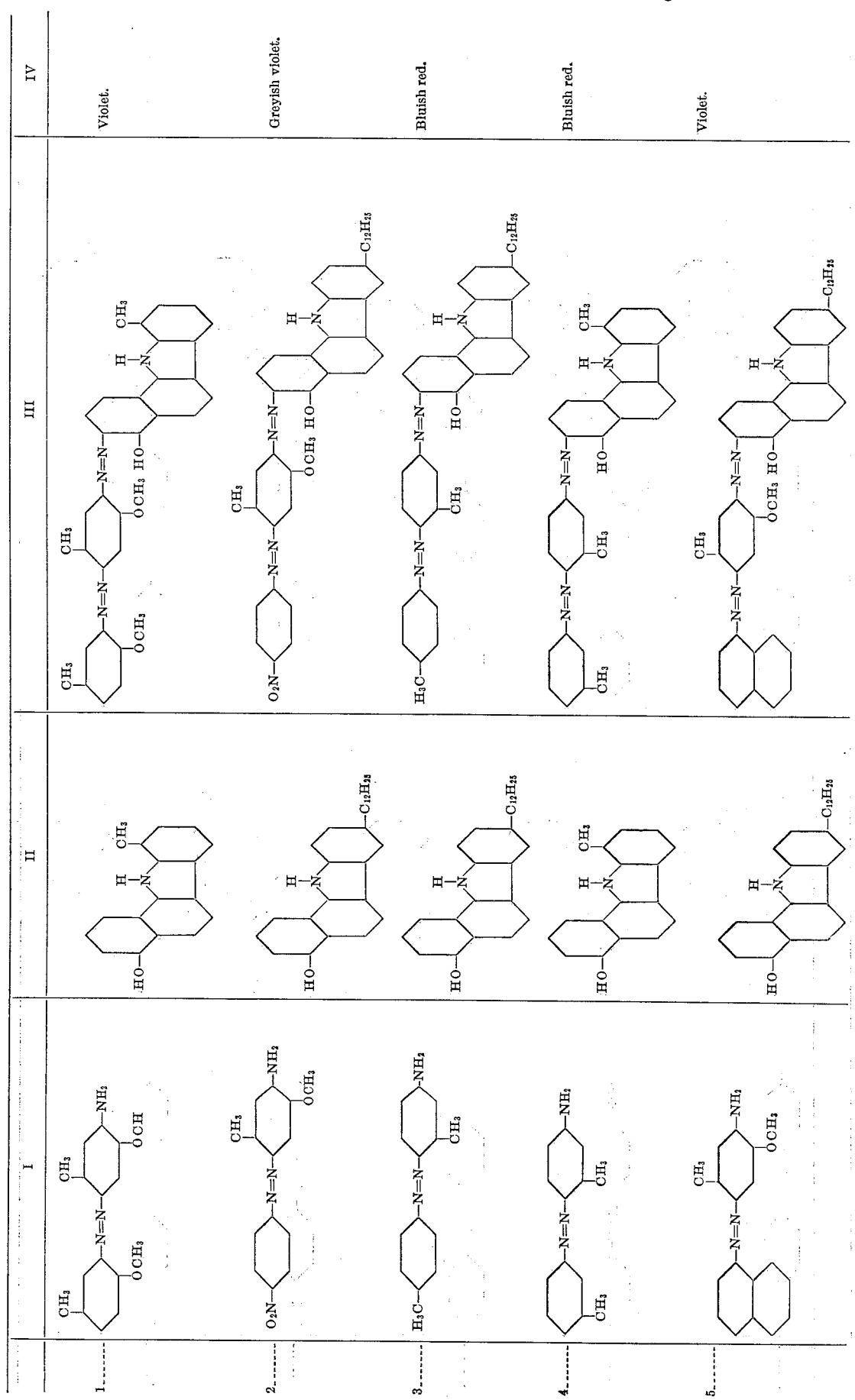

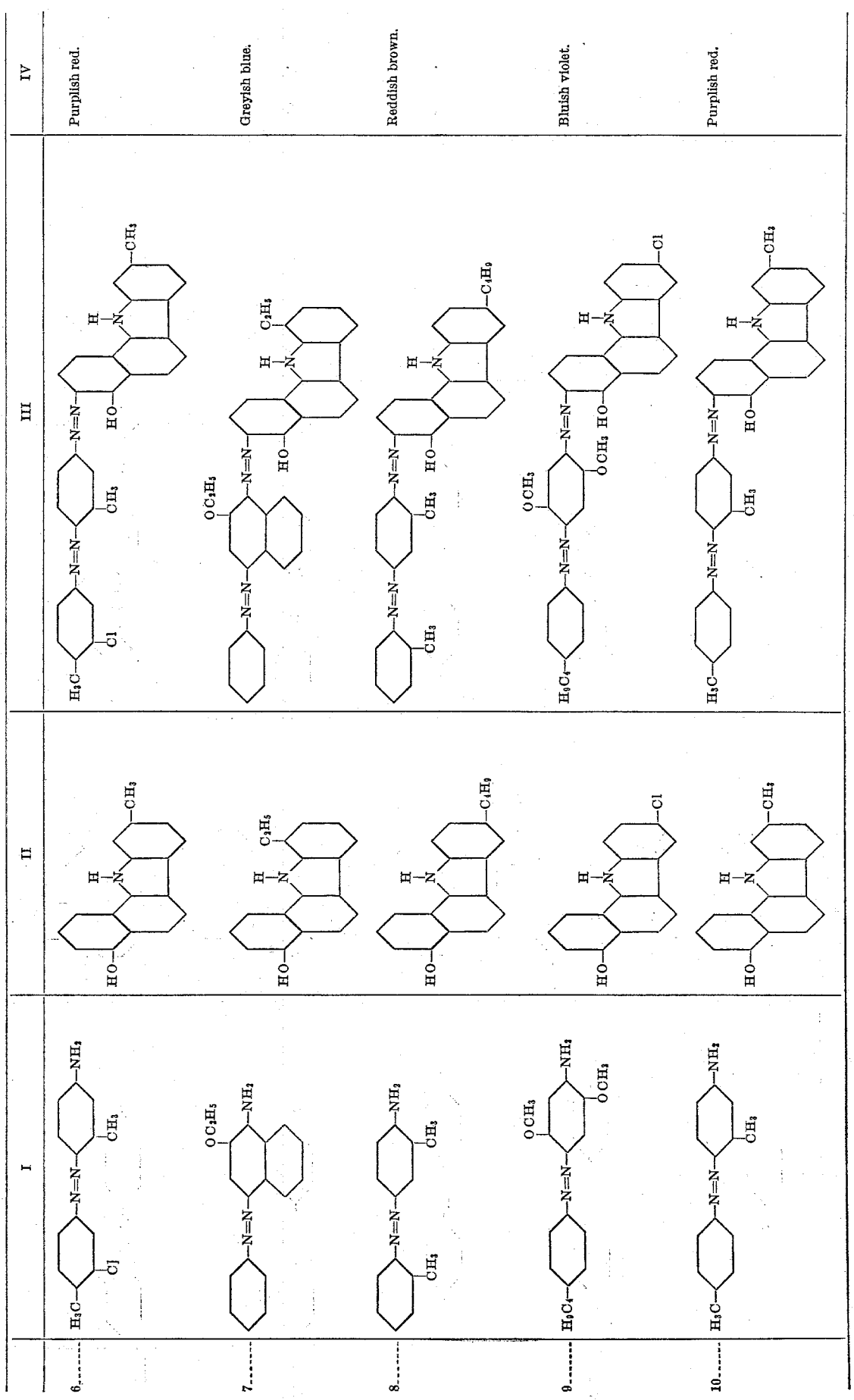

Example 4

Two parts of the disazo dyestuff prepared in the Example 1 is finely divided and added to an aqueous solution of 3 parts of sodium oleyl sulfate dissolved in 8,000 parts of water.

Into the dispersion of the dyestuff, 200 parts of a fabric made of polyolefine fiber, is dipped and temperature is raised slowly up to 80°–120° C., and the fabric is dyed at this temperature for 1 hour.

Then, the fabric is washed with 10,000 parts of a 0.2% aqueous sodium alkylbenzenesulfonate solution at 95° C. for 10 minutes, then washed with water and dried.

In this way, the polyolefine fiber can be dyed in brown color with high fastnesses to light, washing, sublimation, and organic solvents.

Example 5

A dyeing is carried out in the same way as in the Example 4, except that 2 parts of the disazo dyestuff prepared in the Example 2 is used in place of the dyestuff used in the Example 4. Polyolefine fabric is dyed in reddish purple color with high fastnesses to light, washing, sublimation and organic solvents in practical use.

Example 6

The following table sets forth other disazo dyestuffs according to the present invention and the color tones when dyed onto a polyolefine fabric according to the invention. In the table, column I shows monoazo-amino components prepared by coupling of a diazotized first component with a second component. Column II shows third components to be coupled with the diazotized monoazo-amino components. Column III shows the disazo dyestuffs obtained by coupling the diazotized monoazo-amino component with the third component. Column IV shows the color tones on polyolefin fabric.

What we claim is:

1. A disazo disperse dyestuff having the formula:

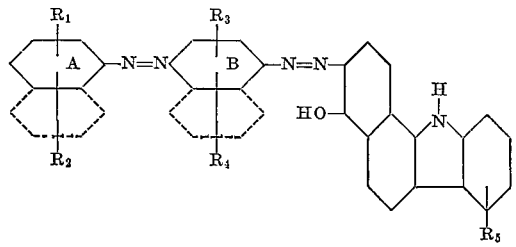

wherein $R_1$ and $R_2$ each represents a member selected from the group consisting of hydrogen and chlorine atoms, lower alkyl and lower alkoxy radicals and nitro radical, $R_3$ and $R_4$ each represents a member selected from the group consisting of hydrogen and chlorine atoms and lower alkyl and lower alkoxy radicals; $R_5$ represents a member selected from the group consisting of hydrogen and chlorine atoms and alkyl radicals having up to 12 carbon atoms; and A and B each represent a nucleus selected from benzene and naphthalene nuclei.

2. A disazo disperse dyestuff according to claim 1 wherein $R_1$ and $R_2$ each represents a member selected from the group consisting of hydrogen and chlorine atoms, lower alkyl radicals having 1 to 4 carbon atoms, and methoxy and nitro radicals; $R_3$ and $R_4$ each represents a member selected from the group consisting of hydrogen atom, and methyl and methoxy radicals; $R_5$ represents a member selected from the group consisting of chlorine atom and alkyl radicals having up to 12 carbon atoms; and A and B both represent benzene nuclei.

3. A disazo disperse dyestuff according to claim 1 wherein $R_1$, $R_2$ and $R_4$ represent hydrogen atoms; $R_3$ represents an ethoxy radical; $R_5$ represents a member selected from the group consisting of chlorine atom, and alkyl radicals having up to 12 carbon atoms; A represents a benzene nucleus; and B represents a naphthalene nucleus.

4. A disazo disperse dyestuff according to claim 1 wherein $R_1$ and $R_2$ represent hydrogen atoms; $R_3$ represents a methyl radical; $R_4$ represents a methoxy radical; $R_5$ represents a member selected from the group consisting of chlorine atom and alkyl radicals having up to 12 carbon atoms; A represents a naphthalene nucleus; and B represents a benzene nucleus.

References Cited by the Examiner
UNITED STATES PATENTS

| | | | |
|---|---|---|---|
| 1,763,216 | 6/1930 | Bucherer | 260—164 XR |
| 2,128,101 | 8/1938 | Sexton | 260—164 |
| 2,499,800 | 3/1950 | Trepagnier | 260—164 XR |
| 2,878,244 | 3/1959 | Schmelzer et al. | 260—164 |
| 3,123,433 | 3/1964 | Du Peloux et al. | 8—41 |
| 3,158,435 | 11/1964 | Gaetani et al. | 8—41 |

CHARLES B. PARKER, *Primary Examiner.*

R. J. FINNEGAN, *Examiner.*

FLOYD D. HIGEL, *Assistant Examiner.*